Sept. 3, 1940. F. P. FILES ET AL 2,213,628
TIE FOR COTTON BALES
Filed March 28, 1939 2 Sheets-Sheet 1

Inventor
Frank P. Files
Cora W. Files
By Clarence A. O'Brien
and Hyman Berman
Attorneys Sept. 3, 1940.   F. P. FILES ET AL   2,213,628
TIE FOR COTTON BALES
Filed March 28, 1939   2 Sheets-Sheet 2

Inventor
Frank P. Files
Cora W. Files

By Clarence A. O'Brien
and Hyman Berman
Attorneys

Patented Sept. 3, 1940

2,213,628

UNITED STATES PATENT OFFICE

2,213,628

TIE FOR COTTON BALES

Frank P. Files and Cora W. Files, Corpus Christi, Tex.

Application March 28, 1939, Serial No. 264,654

3 Claims. (Cl. 24—16)

This invention relates to ties for cotton bales, or bales of any other materials, and has for the primary object the provision of a device of this character which will be more economical and practical than the metallic type of tie now employed and which may be readily cut to selected lengths and will not expose workmen to the danger of injury when handling the bale of cotton as that of a metallic tie and is more readily handled and adapted to a bale of cotton and will efficiently retain the bale at the desired density.

With these and other objects in view, the invention consists in certain novel features of construction, combination and arrangement of parts to be hereinafter more fully described and claimed.

For a complete understanding of our invention, reference is to be had to the following description and accompanying drawings, in which Figure 1 is a perspective view illustrating a bale of cotton equipped with ties constructed in accordance with our invention.

Figure 1:
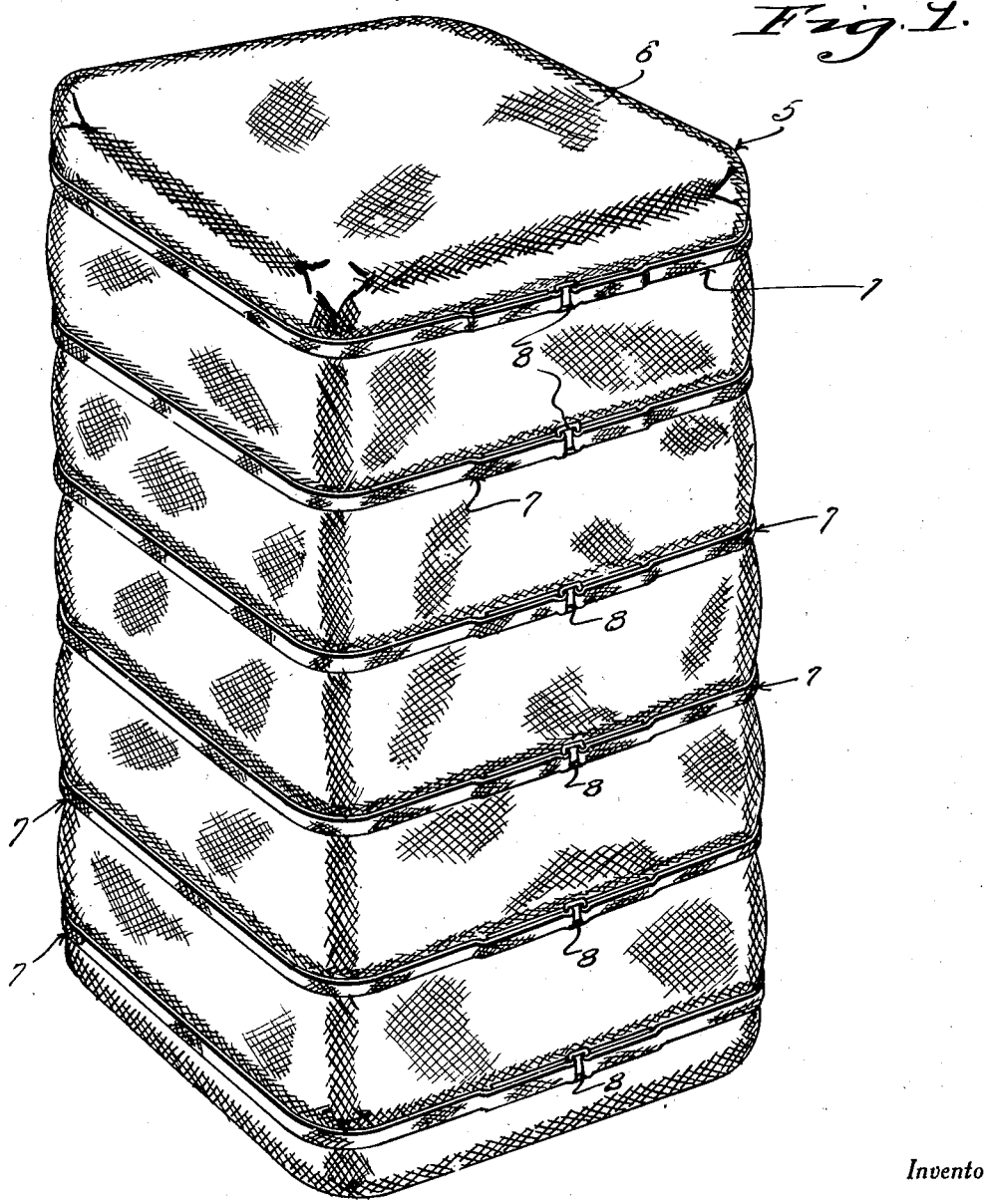
Figure 2:
Figure 2 is a fragmentary plan view illustrating the tie.
Figure 3:
Figure 3 is a fragmentary edge view illustrating the same.

Referring in detail to the drawings, the numeral 5 indicated a conventional bale of cotton, it being understood that the cotton is located within a suitable covering 6 of burlap or similar material. Prior to applying the covering to the cotton the latter is compressed to a desired density and the covering adapted thereto. Also ties are placed about the covering to maintain the compressed cotton to the desired density and in the desired shape. It has been customary to employ metallic ties for this purpose which besides being expensive are seldom usable the second time and frequently subject workmen to the danger of injury. The purpose of the present invention is to provide a tie which is more practical and economical with no possibility of injuring the workmen and capable of withstanding excessive strains. The bale of cotton, as shown in Figure 1, is equipped with a series of ties 7 constructed in accordance with the present invention. These ties are placed a selected distance apart to retain the bale of cotton in proper shape and compressed to the desired density. Also, they may be readily adjusted if it is necessary to recompress the cotton after being once baled whereby the recompressed cotton bale will be maintained in proper shape with the cotton at the selected density.

As each tie 7 is of identical construction, reference to one is thought sufficient for all.

The tie 7 is constructed from a strip of woven fabric or fibrous strands and is made to a selected length, width and thickness and used in conjunction therewith is a fastening loop 8 through which the ends of the tie are passed and then tucked under, as clearly shown in Figure 1, for the purpose of maintaining the tie to the desired tautness on the bale.

Ties made of woven strands of fibrous material will be capable of withstanding excessive strain, more readily adaptable to a bale of cotton, and may be readily cut to desired lengths. Furthermore, a tie of this character will have greater life, as deterioration from dampness will be reduced to a minimum, wherein the metallic tie is subject to rust or corroding, and, further a tie of his character will be more desirable in that same is not made of metal. The advantage of the new tie herein not being of metal is that the same does not collect moisture underneath the tie. The conventional metal tie under some circumstances, due to its metallic nature, collects moisture underneath the metal tie, thus damaging the cotton or other materials in the bale.

Figure 4:
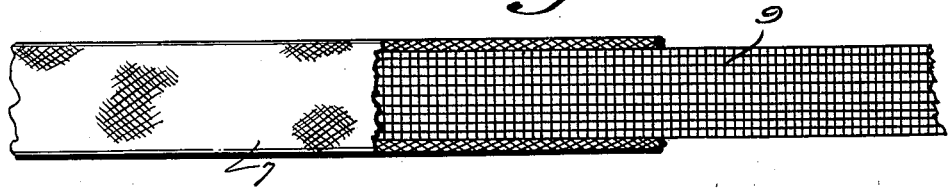
Figure 4 is a fragmentary plan view partly in section showing a modification of our invention.
Figure 5:
Figure 5 is an edge view, partly in section, showing the modification.
Figure 6:
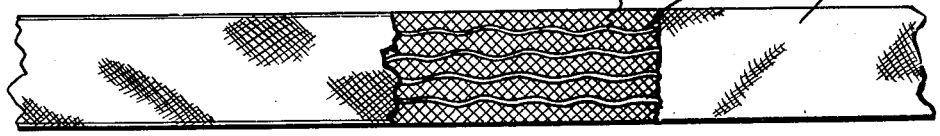
Figure 6 is a fragmentary plan view partly in section showing another modification of our invention.
Figure 7:
Figure 7 is an edge view, partly in section, illustrating the modification of the invention as shown in Figure 6.

Referring to our modified form of invention, as shown in Figures 4 and 5, the strip of woven fibrous strands may be reinforced by a metallic strip 9 of foraminous material. It is to be understood that the tie strip is woven in tubular form and has the foraminous reinforcing strip 9 inserted therein and compressed to form a flat strip. As shown in Figures 6 and 7 the foraminous material also may include metallic strands 10 each of corrugated formation. A tie strip constructed in accordance with the showing made in Figures 4 to 7 will have maximum strength so as to withstand maximum amount of strain and may be readily brought into position onto a bale and secured and further cut to any length desired.

It is believed that the foregoing description, when taken in connection with the drawings will fully set forth the construction and advantages of this invention to those skilled in the art to which such device relates, so that further detailed description will not be required.

Having described the invention, what is claimed is:

1. A tie for cotton bales comprising a fibrous strap adapted to snugly embrace a bale of compressed cotton and woven from fibrous strands providing roughened faces to said strap, self-sustaining metallic reinforcing means in the strap, said strap insertible through a rigid loop member in the direction of the bale of cotton and bent on itself to provide end portions arranged between the strap and the bale of cotton and sustained in said position by said metallic reinforcing means with the roughened faces of the strap and the roughened faces of the end portions contacting under the influence of the compressed cotton of the bale to prevent slipping of the strap in the rigid loop member and becoming slack on the bale of cotton.

2. A tie for cotton bales comprising a metallic reinforced bendable and self-retentive strap of material woven from fibrous strands and adapted to snugly embrace a bale of compressed cotton with end portions thereof insertible through a rigid loop member in the direction of the bale of cotton and formed into self-sustaining return bends occupying positions between the body portion of the strap and the cotton bale and forced against said strap to prevent slipping of said return bends in the loop member by the counteracting expansion of the compressed cotton.

3. A tie for cotton bales comprising a fibrous strap adapted to snugly embrace a bale of compressed cotton and woven from fibrous strands providing roughened faces to said strap, bendable metallic reinforcing elements embedded in said strap and acting to reinforce the latter and to render said strap self-sustaining as to shape, said strap insertible through a rigid loop member in the direction of the bale of cotton and bent on itself to provide end portions arranged between the strap and the bale of cotton and sustained in said position by said reinforcing elements with the roughened faces of the strap and the roughened faces of the end portions contacting under the influence of the compressed cotton of the bale to prevent slipping of the strap in the rigid loop member and becoming slack on the bale of cotton.

FRANK P. FILES.
CORA W. FILES.